United States Patent [19]

McArthur

[11] Patent Number: 4,651,633
[45] Date of Patent: Mar. 24, 1987

[54] BAKERY EQUIPMENT FOR MAKING FUNNEL CAKES AND THE LIKE

[75] Inventor: Donald A. McArthur, Jefferson

[73] Assignee: Denjoy, Inc., St. Louis, Mo.

[21] Appl. No.: 786,848

[22] Filed: Oct. 11, 1985

[51] Int. Cl.⁴ ............................................. A47J 37/12
[52] U.S. Cl. ....................................... 99/335; 99/407;
  99/447; 222/485; 425/377; 425/403.1; 425/464;
  426/523; 426/552
[58] Field of Search ................. 99/353, 403, 404, 407,
  99/334, 335, 336, 405, 447; 141/362; 425/376
  R, 377, 378 R, 383, 385, 403.1, 464; 222/485;
  426/516, 523, 552, 496

[56] References Cited

U.S. PATENT DOCUMENTS

| | | | |
|---|---|---|---|
| 2,917,008 | 12/1959 | Kipnis | 99/353 |
| 3,149,978 | 9/1964 | Anderson | 99/404 X |
| 3,326,116 | 6/1967 | Belshaw | 99/407 X |
| 4,170,253 | 10/1979 | McArthur | 141/362 |
| 4,397,879 | 8/1983 | Wilson | 426/115 |
| 4,542,685 | 9/1985 | Wilson | 426/523 X |

Primary Examiner—Billy J. Wilhite
Attorney, Agent, or Firm—Polster, Polster and Lucchesi

[57] ABSTRACT

A machine for making funnel cakes includes a holding tank for containing a generally fluid batter, a channel suitable for containing a cooking liquid, and a heater for heating the cooking liquid in the channel to a temperatures suitable for cooking funnel cakes. A plate is disposed at one end of the channel in an upper position adjacent the surface of the cooking liquid. A dispensing head dispenses a predetermined amount of batter from the holding tank onto the plate, and a pneumatic cylinder moves the plate from its upper position in which the batter forms a generally solid, uncooked product to a lower position in which the solid uncooked product floats away from the plate. A submerged track in the channel leads away from the deposit station. The funnel cake is guided along this track submerged in the cooking liquid to completely cook the funnel cake as it moves along the track. At the end of the track, the funnel cake is automatically removed from the cooking liquid.

33 Claims, 12 Drawing Figures

BAKERY EQUIPMENT FOR MAKING FUNNEL CAKES AND THE LIKE

BACKGROUND OF THE INVENTION

This invention relates to bakery products and equipment for making same, and more particularly to a piece of bakery equipment for making funnel cakes and the like.

Conventionally, funnel cakes are made manually by dispensing an amount of funnel cake batter from a funnel-shaped dispenser onto a pan or skillet in a deep fat fryer or the like. The distinctive spiral-like shape of the funnel cake is formed by the user by moving the funnel dispenser in a generally spiral pattern as the batter is dispensed into the hot fat or oil. Certain improvements to such funnel cake dispensers have been designed such as shown U.S. Pat. No. 4,397,879 to Wilson. However, making funnel cakes manually has some distinct disadvantages. Since the entire process is under manual control, the results are inconsistent from cake-to-cake. For example, the shape of funnel cakes can differ significantly, depending on the pattern traced out by the user as he or she drops the batter into the hot fat. A misshapen cake can also result when two funnel cakes cooking in the same hot fat happen to contact each other early in the cooking process. Since it is up to the user to remove the cooked funnel cake from the deep fat at the proper time, the resulting funnel cake can be undercooked, overcooked, or greasy, depending upon the amount of time the user leaves the cake in the deep fat. In addition to the variations in shape mentioned above, the funnel cakes made by hand can vary dramatically in size, depending upon the amount of batter deposited by the user in the hot fat. In addition to these disadvantages, with the prior equipment for making funnel cakes, the rate at which cakes can be made is severely limited by the amount of space available in the deep fat fryer. An increased rate of cake production is possible only by increasing the number of fryers with an accompanying increase in the amount of cleaning involved. In addition, an operator who is responsible for more than one deep fat fryer will be even less likely to remove the cooked funnel cake at the proper time and to have the time to pour consistently good funnel cakes.

Among the several objects and features of the present invention may be noted the provision of bakery equipment which automates the making of funnel cakes.

Another object of the present invention is the provision of bakery equipment which makes funnel cakes at a relatively rapid rate.

Another object of the present invention is the provision of bakery equipment which makes funnel cakes of consistent shape.

Another object of the present invention is the provision of bakery equipment which results in more consistent cooking of funnel cakes.

Another object of the present invention is the provision of bakery equipment which results in funnel cakes of consistent taste.

Other objects and features wiil be in part apparent and in part pointed out hereinafter.

SUMMARY OF THE INVENTION

In accordance with this invention, generally stated, bakery equipment includes a holding tank adapted to contain a generally fluid batter suitable for making a bakery product such as a funnel cake. An elongate channel suitable for containing a cooking liquid such as oil or the like has a deposit station at one end. Means for heating the contents of the channel to a temperature suitable for cooking the bakery product and maintaining the contents generally at the temperature are partially disposed in the channel. A plate is disposed at the deposit station and is movable to an upper position adjacent the surface of the cooking liquid at the deposit station. Means are provided for dispensing a predetermined amount of batter from the holding tank onto the plate when the plate is in its upper position. Means are also provided for moving the plate between its upper position in which the batter forms a generally solid uncooked product and a lower position in which the solid uncooked product floats away from the plate. A track is submerged in the cooking liquid in the channel and leads away from the deposit station. The heating means holds the cooking liquid at a sufficient temperature along the track to fully cook the uncooked product as it moves along the track. Means are also provided to guide the uncooked product from the deposit station to the submerged track. Drive means drive the uncooked product along the submerged track, the length of the submerged track and the speed of the drive means being selected to completely cook the uncooked product to form the bakery product by the time the product reaches the end of the track. Further means remove the cooked bakery product from the cooking liquid at the end of the track.

BRIEF DESCRIPTION OF THE DRAWINGS

In the drawings.

Similar reference characters indicate similar parts throughout the several views of the drawings.

DESCRIPTION OF THE PREFERRED EMBODIMENT

Turning now to the drawings, a piece of bakery equipment or funnel cake machine 11 (FIG. 1) includes a hopper 13 for holding a suitable quantity of generally fluid batter for making a bakery product such as a funnel cake. Hopper 13 is mounted by means of a pole 15 to a base 17 of the funnel cake machine. More specifically, pole 15 has a set of four arms 19 extending therefrom. The upper two arms 19 are fixedly secured at one end to hopper 13, while the other end of each slidingly engages pole 15. The height of hopper 13 above the rest of machine 11 is adjustable by means of a movable stop 21 which can be secured at an appropriate level on pole 15. The second arm 19 from the top rests upon stop 21 at its desired position along the pole.

Figure 1:
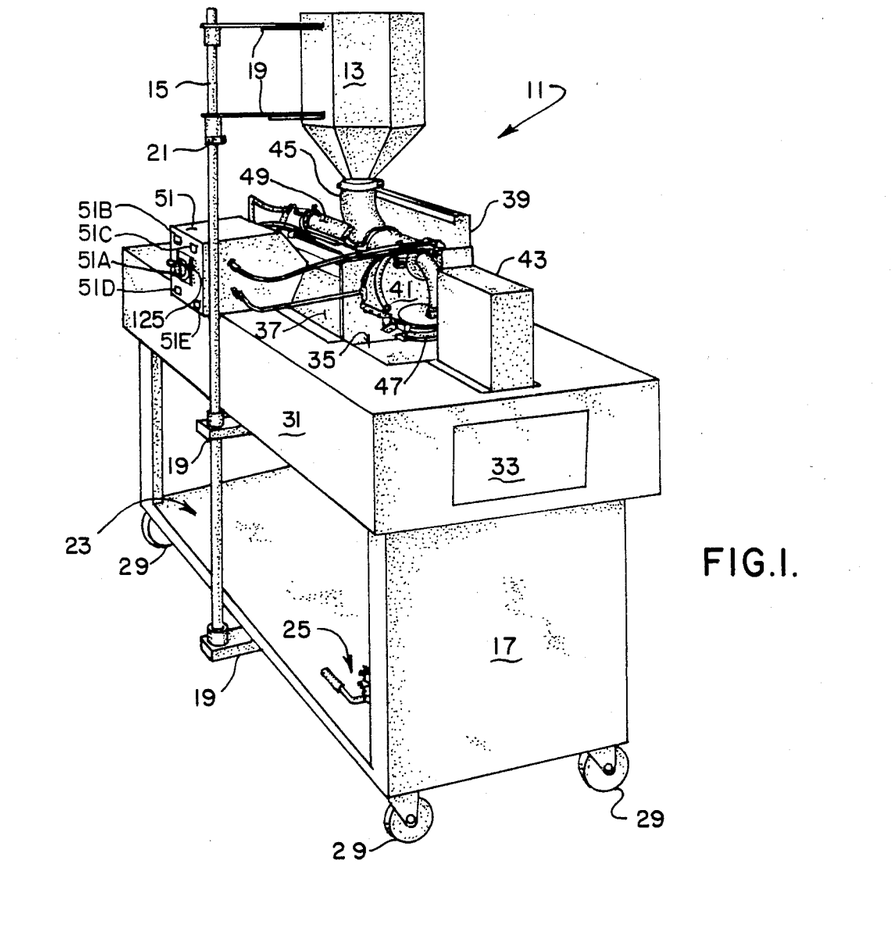
FIG. 1 is a perspective view of bakery equipment of the present invention.

Base 17, in addition to providing the supports for pole 15, includes an open area 23 of suitable size to hold an air compressor (not shown) or other desirable or necessary accessories for use with funnel cake machine 11. Suitably secured to one side wall of base 17 is a valve and coupling 25 suitable for attachment to the air compressor. Base 17 is mounted on a set of four wheels 29 which enable bakery equipment 11 to be easily moved as a unit from place-to-place, as desired.

A platform 31, of stainless steel like all the other major parts of bakery equipment 11, is removably mounted to the top of base 17. Platform 31 includes an access door 33 for providing access to the pneumatic control circuitry of the present invention (discussed below), and it defines a channel 35 which, in use, contains a cooking liquid such as melted fat or oil for cooking the funnel cakes. A pair of shields 37 and 39 are disposed along and above channel 35, and a transverse shield 41 (FIGS. 1 and 11) is also provided for protecting a chain belt drive (described below) from contamination and shielding the equipment and the user from the heat radiated from the cooking liquid. A housing 43 is disposed above platform 31 to house certain movable parts described below.

A conduit 45 in fluid communication with the interior of hopper 13 originates immediately below the hopper and generally between shields 37 and 39. Conduit 45 passes over transverse shield 41 to a dispensing head 47 which is pneumatically operable to dispense a predetermined amount of batter into the cooking liquid in channel 35 at the appropriate time as discussed below. A screen (not shown) is disposed at the bottom of hopper 13 to screen out lumps in the batter of a size which might tend to clog dispensing head 47. A volumetric pump 49, such as shown in U.S. Pat. No. 4,170,253 to McArthur, is operatively connected to conduit 45 to accurately force the predetermined amount of batter out of dispensing head 47 at the proper time in each cycle of bakery equipment 11.

Also shown in FIG. 1 is a housing 51 which has several controls mounted on the front thereof. These controls include a dial 51A for setting the temperature of the cooking liquid, a three amp circuit breaker 51B for controlling a conveyor or belt drive described below, a seven amp circuit breaker 51C for controlling the air compressor, and a thirty amp circuit breaker 51D for controlling the heater which heats the cooking liquid. A start switch 51E for the pneumatic control circuitry of apparatus 11 is also mounted on the face of housing 51.

Channel 35 (see FIG. 2) is generally rectangular in shape. An insulative blanket 53 is disposed below the top surface of platform 31 and surrounds all sides and the bottom of channel 35 to retain the heat in the cooking liquid. The insulative blanket includes a layer of suitable insulating material 55 totally surrounded by a stainless steel enclosure 57, which enclosure is removably mounted by means of a set of tabs 59 to platform 31. Tabs 59 provide a suitable point for attaching enclosure 57 to the platform by means of screws or the like, or platform 31 can be designed to have interlocking recesses to receive the tabs. The insulative blanket 53 is designed to be removable for cleaning purposes. Its presence permits the cooking liquid throughout the entire channel 35 to be maintained at a relatively constant temperature high enough to cook the funnel cakes.

Figure 10:
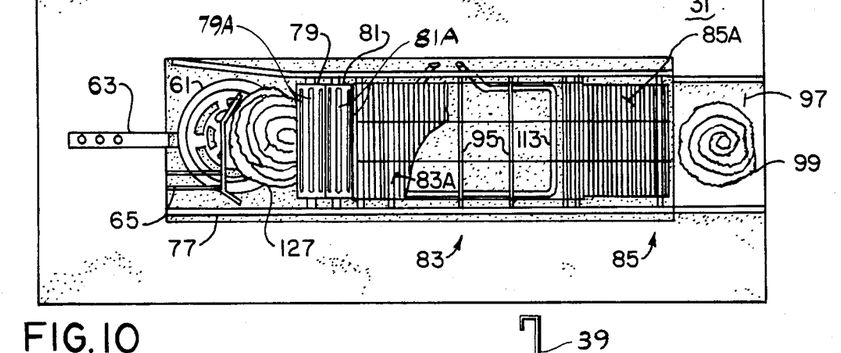
FIG. 10 is a top plan similar to FIG. 2 illustrating the operation of the present invention.

A plate 61 is disposed in channel 35, is movable vertically therein by an arm 63 from which the plate is cantilevered, and defines the deposit station of the present apparatus. Arm 63 is pneumatically controlled to move plate 61 vertically in channel 35 from a position adjacent the surface of the cooking liquid to a submerged position in the channel and is covered by housing 43 when in use. When plate 61 is submerged, a pneumatically operable hand 65 with depending fingers 67 (see FIGS. 3 and 10) is movable from the position shown in FIG. 2 to that shown in FIG. 3. Fingers 67 are disposed generally at and extending below the level of the cooking liquid in apparatus 11 so that, as they are moved to the position shown in FIG. 3, any bakery product present in that portion of channel 35 is pushed to the right, as seen in FIG. 10. A pusher rod 69 (FIG. 3) is secured to hand 65 to impart the desired reciprocating movement to hand 65. A stabilizer bar 71 is provided to prevent rotation of pusher rod 69, hand 65, and fingers 67.

Figure 2:
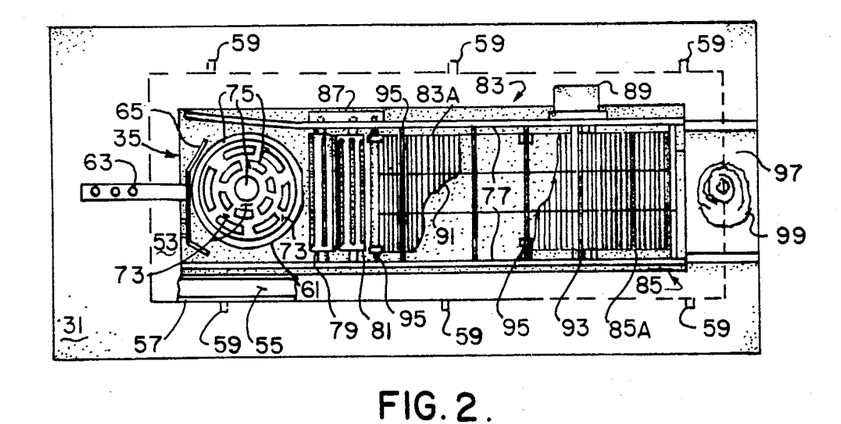
FIG. 2 is a top plan, with parts removed for clarity, of the bakery equipment of FIG. 1.
Figure 3:
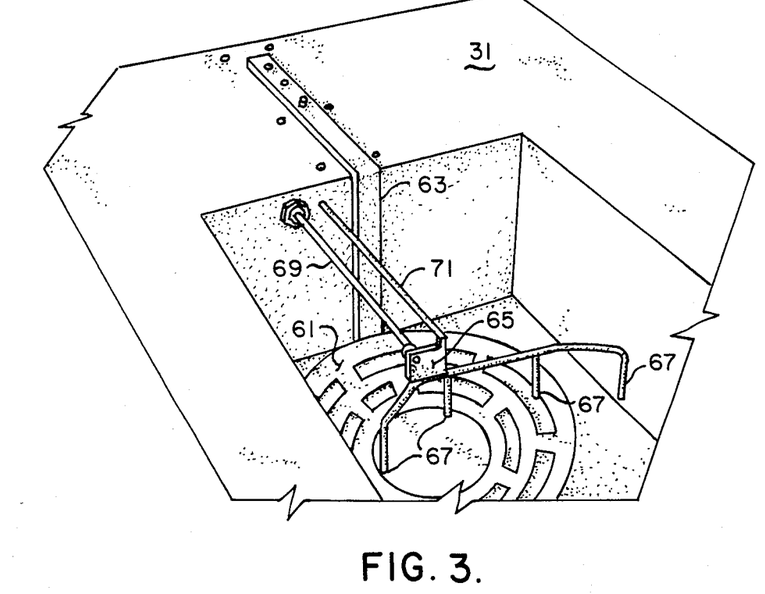
FIG. 3 is a perspective view, on an enlarged scale, of a deposit station of the bakery equipment of FIG. 1.
Figure 9:
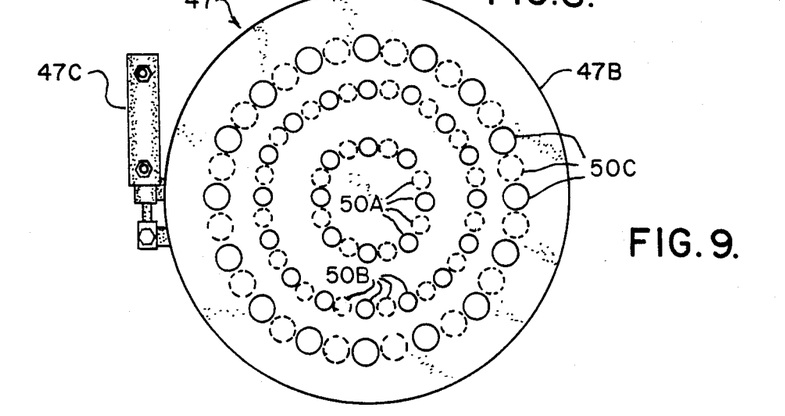
FIG. 9 is a bottom plan of a dispensing head of the bakery equipment of FIG. 1.

As seen in FIGS. 2, 3, and 10, the upper surface of plate 61 has formed therein a series of grooves 73 separated by concentric ridges 75 which form a template for the funnel cake. Ridges 75 are broken at numerous places to allow fluid communication between adjacent grooves in the surface of plate 61. These grooves 73 are disposed under corresponding openings 50A, 50B, and 50C in dispensing head 47 (see FIG. 9). Batter dispensed from dispensing head 47 is deposited into the grooves in plate 61, and the notches in the ridges 75 permit the batter to flow between adjacent grooves to form a solid, uncooked, unitary mass.

Figures 4, 6, 7, 8:
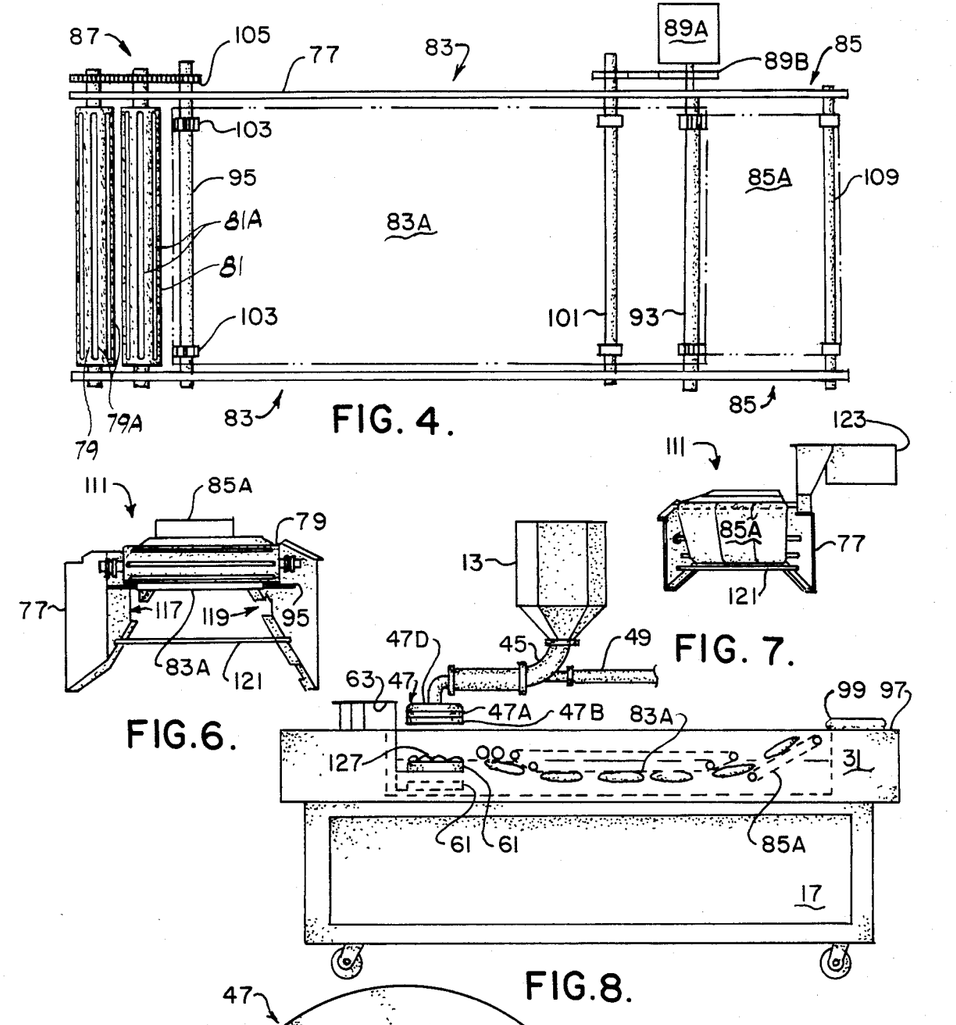
FIG. 4 is a top plan of a drive mechanism of the bakery equipment of FIG. 1.
FIG. 6 is a right side perspective, on a reduced scale, with parts removed for clarity, of a frame and track assemblage of the bakery equipment of FIG. 1.
FIG. 7 is a left side perspective, on a reduced scale, of the frame and track assemblage of FIG. 6.
FIG. 8 is a schematic of the front of the bakery equipment of FIG. 1 illustrating the operation thereof.

Plate 61 (see FIG. 3) is secured at one side to arm 63. Arm 63 includes a generally vertical section extending upwardly from plate 61 along the wall of channel 35 to the top of platform 31. When it reaches the top of platform 31, the arm has a horizontally extending portion which is movably secured to platform 31, as shown in FIG. 8. The upper surface of plate 61 is coated with a non-stick material, such as that sold by DuPont under the trade designation TEFLON.

Also disposed in channel 35 is a frame 77 (FIG. 2) extending longitudinally substantially the entire length of channel 35. Frame 77 supports a pair of rollers 79 and 81, a first belt drive 83, and a second belt drive 85. Rollers 79 and 81 are journaled in frame 77 for rotation about their longitudinal axes, with those axes generally at the same horizontal level. Solid Teflon roller 79 is preferably one and one-half inches in diameter, while solid Teflon roller 81 is preferably somewhat larger, namely two inches in diameter so that roller 81 depends somewhat lower into channel 35 than does roller 79. It should be realized that these two rollers can be replaced, if desired, by a single roller to perform the same function, which is to submerge a solid but uncooked bakery product down to the level of first belt drive and to allow the top of the bakery product to at least partially cook before it reaches first belt drive 83. Rollers 79 and 81 both have grooves 79A and 81A, respectively extending longitudinally thereof, which makes the grooves transverse to the longitudinal axis of channel 35. Rollers 79 and 81 are operatively connected by a suitable chain and sprocket drive 87 to first belt drive 83. Belt drive 83 is driven by an electric motor and transmission unit 89 operatively connected to the end of belt drive 83 opposite rollers 79 and 81. Belt drive 83 is comprised of a plurality of interlocked individual metal links 91 which form a continuous belt 83A. The belt intermeshes with the sprockets on a drive rod 93 operatively connected to electric motor and transmission unit 89 and with similar sprockets on a plurality of idlers 95. The idlers and drive rod, like rollers 79 and 81, are journaled in the walls of the frame 77 for rotation. The leftmost idler 95 is connected by means of chain and sprocket drive 87 to the rollers 79 and 81 so that movement of the belt is transmitted to rollers 79 and 81 to cause them to rotate about their longitudinal axes. As will become apparent, first drive 83 forms a conveyor for conveying bakery products, such as funnel cakes, from the position of plate 61 to the second belt drive 85. The bottom of belt 83A, along with frame 77, also defines the track along which the uncooked funnel cakes move as they are being cooked. Second belt drive 85 is similar in construction to first belt drive 83. It differs, however, in that whereas the uncooked funnel cakes travel along the underside of belt drive 83, they travel on the top surface of belt drive 85. In addition, drive 85 is suitably geared to move at a greater lineal speed than drive 83 to rapidly remove funnel cakes from the end of drive 83, which prevents funnel cakes from backing up at that point. Drive 85 terminates adjacent the top surface of platform 31 in an exit station 97 for the cooked funnel cakes 99.

The belt drives 83 and 85 are shown in more detail in FIG. 4. Both drives are powered by an electric motor 89A operatively connected to a transmission unit 89B. Transmission unit 89B contains a series of gears which provide a first speed to drive rod 93 for belt drive 83 and a second speed to a drive rod 101 of belt drive 85. The number of teeth of the gears making up transmission unit 89B is selected so as to provide a higher lineal speed for belt drive 85 than for belt drive 83. In plan, as shown in FIG. 4, the belts 83A and 85A of belt drives 83 and 85 overlap to ensure that cooked funnel cakes driven along channel 35 by belt drive 83 are picked up by belt drive 85 and deposited at the exit station 97. Of course, depending on the dimensions involved, it might not be necessary to have such an overlap. Drive rod 93, when it rotates about its longitudinal axis, causes the links of belt 83A to move translationally along the channel. The distal end of belt 83A is looped over an idler 95 which includes sprockets 103 disposed at each end thereof, which sprockets are engaged by the links of the belt. Translation of the links of belt, therefore, results in rotation of idler 95 about is longitudinal axis. Idler 95 extends through frame 77 at one side and terminates in a second sprocket 105 which is part of chain and sprocket drive 87. Chain and sprocket drive 87 operatively connects sprocket 105 with rollers 79 and 81 so that rotation of idler 95 results in corresponding rotation of rollers 79 and 81. In a similar manner, rotation of drive rod 101 results in the translation of the links of belt 85A along its path. The distal end of belt 85A terminates in an idler 109 which is journaled in the walls of frame 77 as well.

Figure 5:
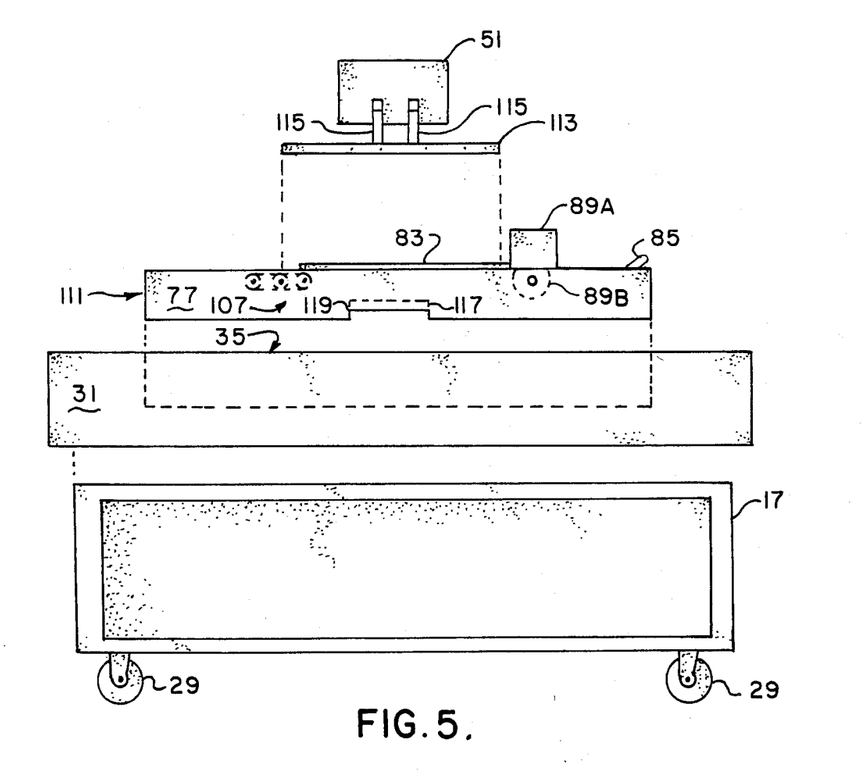
FIG. 5 is an exploded back elevation of the bakery equipment of FIG. 1.

Turning now to FIG. 5, frame 77 and belt drives 83 and 85 are removable as a single unit or assemblage 111 from channel 35 in platform 31. During use, assemblage 111 sits in channel 35. Its easy removal from the channel facilitates the cleaning of bakery equipment 11 and particularly facilitates the cleaning of platform 31 and assemblage 111. In addition, motor 89A is designed to be easily removable from assemblage 111 so that the entire assemblage can be submersed for cleaning without damage to any components. In a similar manner, platform 31 sits on top of base 17 and is easily removable therefrom to promote cleaning of the base as well.

Electrical control housing 51 has secured thereto at its rear an elongate resistive heating element 113. Heating element 113 has a generally flat body portion which, in use, lies adjacent the bottom of channel 35 to maintain the cooking liquid in the channel at a predetermined temperature, as set by the dial 51A on housing 51. Heating element 113 also includes two upwardly extending members 115 which are secured through the back of housing 51 to a suitable source of electric power. Referring briefly to FIG. 10, heating element 113 is seen to generally define the outline of a rectangle having generally the same width as frame 77. Adjacent housing 51, frame 77 (FIG. 5) includes an opening 117 to permit the passage of the heating element through the frame. A similar but smaller opening 119 is present in the opposite wall of the frame 77. Once assemblage 111 is lifted out of channel 35, heating element 113 is no longer confined in the channel, and the heating element and housing 51 can be lifted out as a unit, which again facilitates cleaning of bakery equipment 11.

Assemblage 111 (see FIG. 6) includes a number of stabilizer bars 121 secured to the two walls of frame 77. As can be seen in FIG. 6, belt 83A in its lower extent is below the surface of rollers 79 and 81. This is to ensure that a bakery product being cooked in the apparatus 11 of the present invention is fully submerged in the cooking liquid as it is moved by belt drive 83. A stabilizing bar 121 is shown in FIG. 7 to stabilize the opposite end of assemblage 111. As can be seen in FIGS. 6 and 7, belt 85A extends at its upper reach beyond the level of frame 77. In fact, this level is selected so that funnel cakes present on the upper surface of belt 85A will be completely removed from channel 35 and deposited on platform 31. A suitable housing 123 for motor 89A and transmission unit 89B extends upwardly from frame 77 adjacent belt drive 85.

Figure 11:
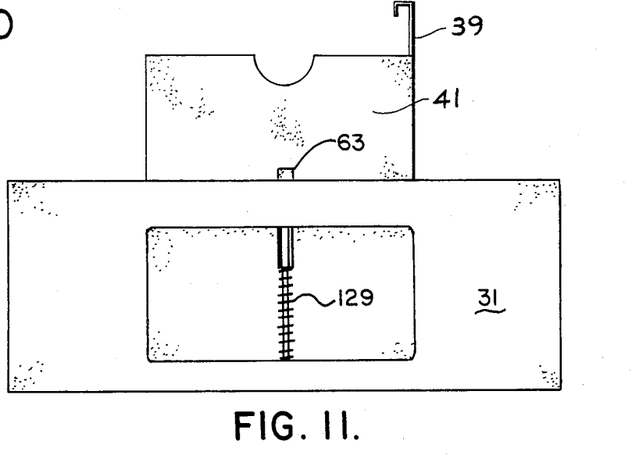
FIG. 11 is a side view, with parts broken away for clarity, of a lift mechanism of the bakery equipment of FIG. 1.

The operation of bakery equipment 11 is illustrated in FIGS. 1 and 8–11. To begin the manufacture of funnel cakes using bakery equipment 11, the operator first turns on the resistive heating element 113 and sets the desired temperature thereof by means of dial 51A on the face of housing 51. Once the cooking liquid is brought up to the desired operating temperature by resistive heating element 113 and batter is poured into hopper 13, the cooking process is ready to begin. When apparatus 11 is not operating to make funnel cakes, plate 61 is held submerged in the cooking liquid in the position shown by dashed lines in FIG. 8. When a funnel cake is ready to be made, arm 63, which is operated by a pneumatic cylinder 131 discussed below, raises plate 61 to a position in which its top surface is adjacent the level of the cooking liquid. At this point, volumetric pump 49 forces a predetermined quantity of batter through dispensing head 47 onto plate 61. As can be seen from FIGS. 8 and 9, dispensing head 47 includes first and second rotatable disks 47A and 47B which are pneumatically rotatable by means of an air cylinder 47C with respect to each other. Disks 47A and 47B have a series of openings 50A, 50B and 50C arranged in concentric circles or rings around the center of each disk. When the dispensing head is not dispensing batter, these holes are offset with respect to each other so that no batter passes through dispensing head 47. When pneumatic cylinder 47C is actuated, however, bottom disk 47B is rotated with respect to upper disk 47A to cause the openings in the disks to align, and an accurately controlled amount of batter in a chamber 47D which is located above upper disk 47A, is forced by volumetric pump 49 out through the openings in the disks. The outer ring of openings 50C is somewhat larger than the openings 50A and 50B of the inner rings. This is to ensure that sufficient batter is dispensed to form a continuous outer perimeter of the funnel cake being made. Dispensing head 47 is disposed directly above plate 61. When batter is dispensed from dispensing head 47, it falls into the grooves 73 of plate 61 and begins to flow together through the notches in the ridges of the plate to form a generally solid but uncooked funnel cake 127. Arm 63 is pneumatically timed to hold the plate in this cooking position adjacent the top of the cooking liquid for a period of from six to eight seconds to allow the batter to solidify somewhat to hold together the uncooked funnel cake 127. After that time period expires, arm 63 is moved downwardly, thereby carrying plate 61 to the position shown in dashed lines in FIG. 8. The solid but uncooked funnel cake floats away from the plate as the plate is moved downwardly. Once plate 61 is moved to its lower position, hand 65 is pneumatically moved to the right as shown in FIG. 10 to force funnel cake 127 under rollers 79 and 81. Rollers 79 and 81 rotate in such a direction as to cause the uncooked funnel cake to continue travelling down and to the right, at which point it encounters belt 83A. The rollers serve to submerge the uncooked funnel cake 127 so that it is completely covered by the cooking liquid, so that the top may become at least partially cooked before it reaches belt 83A to prevent the funnel cake from cooking around one of the links 91 of the belt. As noted above, the underside of belt 83A is also below the surface of the cooking liquid so that as the belt carries the funnel cake along its path, the funnel cake is completely submerged in the cooking liquid. As the funnel cake reaches the rightmost extent of belt 83A as shown in FIG. 8, the path taken by the belt and hence by the funnel cake curves upwardly, which allows the funnel cake, which by now is cooked, to be removed from the cooking liquid by belt 85A and deposited at the exit station 97. The speed of belt 83A and the length of the path along which the funnel cakes are moved is selected so that the funnel cake is fully cooked but not overcooked by the time it is removed from the cooking liquid by belt 85A. As indicated in FIG. 8, the process of making funnel cakes with the present apparatus is a continuous one so that funnel cakes 127 in various stages of cooking are being carried along by belt 83A at the same time. As soon as one funnel cake is forced under rollers 79 and 81 as shown in FIG. 10, the hand 65 is retracted and plate 61 raised so that another funnel cake may be automatically deposited onto plate 61. When a cooked funnel cake reaches the exit station, it need merely be sprinkled with sugar or the like to have a finished bakery product. As shown in FIG. 11, arm 63 is held in its lower or retracted position by a spring 129 until it is forced upwardly by air cylinder 131 (FIG. 12) to receive batter for the next funnel cake. This is to ensure that the plate remains submerged in the cooking liquid at all times except when it is receiving batter for a new funnel cake. Spring 129 also serves to counterbalance the weight of the plate as it is moved upwardly by the air cylinder.

Figure 12:
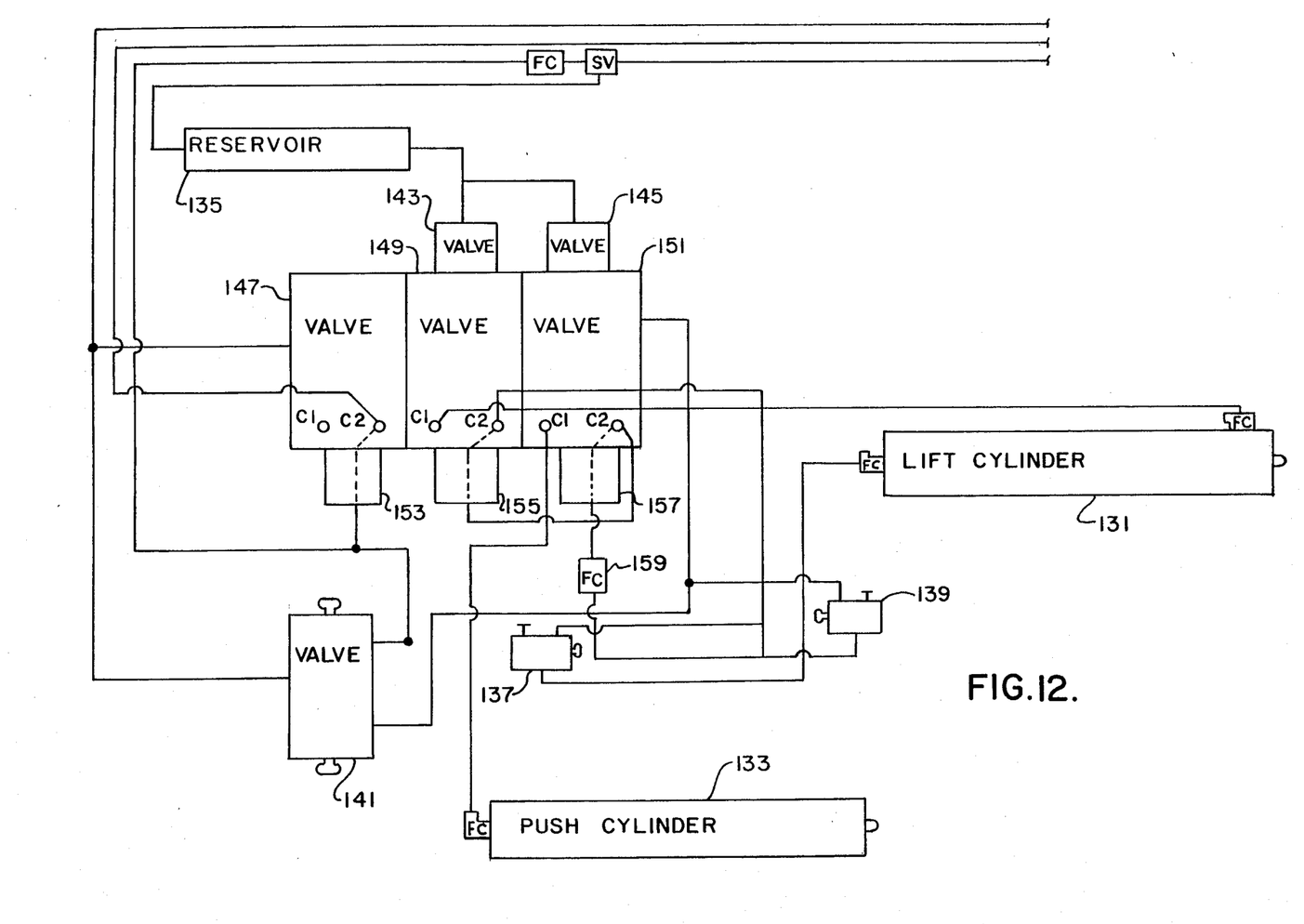
FIG. 12 is a schematic of the pneumatic circuitry of the present invention.

Although it is believed that from the above one of ordinary skill in the art can readily construct the pneumatic circuitry which causes the described operations to occur in the sequence set forth above, FIG. 12 discloses the heart of the pneumatic circuitry for performing these functions. This pneumatic circuitry includes lift cylinder 131 for moving arm 63 and plate 61 between their upper and lower positions, a push cylinder 133 for moving hand 65 between its retracted and extended position, and a reservoir 135 for providing the means to generate the six- to eight-second delay while the plate is held in the upper position to form the batter into a generally solid, uncooked funnel cake. The pneumatic circuitry also includes a pair of valves 137 and 139 which are actuated mechanically by the lift cylinder 131 when the plate reaches the upper and lower positions, so that the functions which are sequenced or timed with respect to the reaching of those positions can be properly controlled. For example, when the plate reaches its upper position, the dispensing of the preset amount of batter from dispensing head 47 is triggered as is the six- to eight-second timer. When the plate reaches its lowest position, the push cylinder is actuated to move hand 65 outwardly to push the funnel cake under the rollers and the hand then retracts. A valve 141 actuated by the push cylinder 133 reaching its extreme position is also provided to provide for the sequencing of operations with respect to the movement of hand 65. For example, once the hand reaches its fully retracted position, plate 61 starts moving back upwardly again to receive the batter for a new funnel cake. Reservoir 135 is connected to an automatic snap valve 143 and to an automatic valve 145. When the pressure in reservoir 135 reaches 40 pounds, automatic snap valve 143 actuates to initiate the lowering of plate 61. Valves 143 and 145 are disposed above a manifold of three valves 147, 149, and 151 which are connected as shown to an automatic reset valve 153 and two automatic valves 155 and 157 to properly sequence the operation of the lift cylinder and push cylinder. A flow control 159 is disposed between automatic valve 153 and valve 139. Of course, other pneumatic control circuits could be used to perform the same functions discussed above. It should be noted, however, that the operation of the pneumatic circuitry of FIG. 12 is completely independent of the movement of drive belt 83A, and drive belt 85A, which are both operated electrically rather than pneumatically.

In view of the above, it will be seen that the various objects of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. Bakery equipment comprising:
    a holding tank adapted to contain a generally fluid batter suitable for making a bakery product;
    an elongate channel suitable for containing a cooking liquid such as oil or the like, one end of said channel being a deposit station;
    means for heating the contents of the channel to a temperature suitable for cooking the bakery product and maintaining said contents generally at that temperature;

a plate disposed at the deposit station and movable in the channel to an upper position adjacent the surface of the cooking liquid at said deposit station;

means for dispensing a predetermined amount of batter from the holding tank onto the plate when the plate is in its upper position;

means for moving the plate between its upper position in which the batter forms a generally solid uncooked product and a lower position in which the solid uncooked product floats away from the plate;

a track in said channel, submerged in cooking liquid and leading away from the deposit station, said cooking liquid along the track being held at a sufficient temperature by the heating means to fully cook the uncooked product as it moves along the track;

guide means for guiding the uncooked product from the deposit station to the submerged track;

drive means for driving the uncooked product along the submerged track, the length of the submerged track and the speed of the drive means being selected to completely cook the uncooked product to form the bakery product by the time said product reaches the end of the track; and means for removing the cooked bakery product from the cooking liquid at the end of the track.

2. The bakery equipment as set forth in claim 1 wherein the plate has a top surface shaped to form a template for the bakery product.

3. The bakery equipment as set forth in claim 2 wherein the bakery product is a funnel cake and a top surface of the plate has formed therein a series of interconnected concentric grooves.

4. The bakery equipment as set forth in claim 1 wherein the plate is cantilevered from the moving means and the moving means further includes means for counterbalancing the weight of the plate.

5. The bakery equipment as set forth in claim 1 wherein the upper surface of the plate is coated with a non-stick material.

6. The bakery equipment as set forth in claim 1 further including means to ensure that the plate remains submerged in the cooking liquid until the dispensing means is ready to dispense batter onto the plate.

7. The bakery equipment as set forth in claim 1 wherein the dispensing means includes a positive displacement, volumetric pump.

8. The bakery equipment as set forth in claim 1 wherein the dispensing means includes a dispensing head disposed above the plate through which the batter is dispensed onto the plate.

9. The bakery equipment as set forth in claim 8 wherein the dispensing head includes a pattern of openings therein through which the batter flows and the plate has a corresponding pattern formed in its upper surface, said patterns corresponding to the shape of the desired bakery product.

10. The bakery equipment as set forth in claim 9 wherein the bakery product is a funnel cake, wherein the pattern of openings in the dispensing head is a series of concentric rings, the openings in the dispensing head of the outermost concentric ring being larger than the openings of the inner rings.

11. The bakery equipment as set forth in claim 8 wherein the dispensing head includes a pair of disks, each disk having a set of openings therethrough, one of said disks being rotatable with respect to the other about a mutual axis, further including means for rotating the disks with respect to each other from a first position in which the openings of one of the disks is closed by the other disk to a second position in which the openings of the two disks align to permit batter to pass therethrough to the plate.

12. The bakery equipment as set forth in claim 1 further including control means for controlling the plate moving means to hold the plate in the upper position for a predetermined length of time after the batter has been dispensed thereon and to thereupon lower the plate to its lower position, the predetermined length of time being selected to give the batter sufficient time to form an uncooked solid which will remain intact upon the lowering of the plate.

13. The bakery equipment as set forth in claim 12 wherein the control means is pneumatic.

14. The bakery equipment as set forth in claim 1 wherein the submerged track is of sufficient length that a plurality of the bakery product may be cooking simultaneously along the track.

15. The bakery equipment as set forth in claim 14 wherein the track is generally the same width as the bakery product.

16. The bakery equipment as set forth in claim 1 wherein the track is defined at its upper extent by the drive means.

17. The bakery equipment as set forth in claim 16 wherein the drive means includes a continuous belt of relatively open construction disposed above the track.

18. The bakery equipment as set forth in claim 17 wherein the belt comprises interconnected metal links.

19. The bakery equipment as set forth in claim 17 wherein the belt slopes downwardly as one moves along the track away from the deposit station.

20. The bakery equipment as set forth in claim 17 wherein the drive means further includes a motor operatively connected to the belt to drive the belt along its path.

21. The bakery equipment as set forth in claim 1 wherein the guide means includes at least one roller for submerging the bakery product from the deposit station to the track, said roller being operatively connected to the belt so that the roller rotates as the belt moves the uncooked product along the track.

22. The bakery equipment as set forth in claim 21 wherein said roller has a non-stick surface.

23. The bakery equipment as set forth in claim 21 wherein the guide means includes at least two adjacent rollers.

24. The bakery equipment as set forth in claim 21 wherein the top of the uncooked product at least partially cooks before it reaches the track.

25. The bakery equipment as set forth in claim 21 wherein the roller is longitudinally grooved and disposed at right angles to the direction of travel of the uncooked bakery product.

26. The bakery equipment as set forth in claim 21 wherein the guide means includes a reciprocable pusher assembly which pushes the uncooked bakery product from the vicinity of the plate to the roller.

27. The bakery equipment as set forth in claim 26 wherein the pusher assembly includes a plurality of downwardly extending fingers reciprocally movable by a pusher rod secured thereto.

28. The bakery equipment as set forth in claim 27 wherein the pusher assembly further includes a stabilizer bar generally parallel to the pusher rod.

29. The bakery equipment as set forth in claim 26 further including pusher assembly drive means for reciprocally moving the pusher assembly back and forth, said pusher assembly drive means being independent of the drive means for the submerged track.

30. The bakery equipment as set forth in claim 1 wherein the drive means includes an electrical motor and electrical controls therefor, which motor and controls are readily removable from the equipment.

31. The bakery equipment as set forth in claim 1 wherein the heating and maintaining means includes a thermally insulative blanket disposed around the channel.

32. The bakery equipment as set forth in claim 1 wherein the plate moving means is preset to hold the plate with batter thereon generally adjacent the surface of the cooking liquid a predetermined time selected to allow the batter to partially cook before the plate is moved downwardly.

33. The bakery equipment as set forth in claim 1 wherein the removing means includes a belt drive driven at a rate faster than the bakery products move along the track.

* * * * *